Oct. 21, 1958 L. P. PÅLSSON 2,856,770
APPARATUS FOR MEASURING PLAY IN A TRANSMISSON
Filed Feb. 2, 1953 2 Sheets-Sheet 1

INVENTOR
LENNART PAUL PÅLSSON
BY
ATTORNEY

United States Patent Office 2,856,770
Patented Oct. 21, 1958

2,856,770
APPARATUS FOR MEASURING PLAY IN A TRANSMISSION

Lennart Paul Pålsson, Bofors, Sweden, assignor to Aktiebolaget Bofors, Bofors, Sweden, a corporation of Sweden Application February 2, 1953, Serial No. 334,452
Claims priority, application Sweden February 15, 1952
7 Claims. (Cl. 73—162)

The present invention relates to apparatus for measuring play in a mechanical transmisison such as a gear train.

Transmissions of the general type above referred to, particularly transmissions in form of gear trains have in practically all cases a certain amount of play, that is the input member of the transmission may move a certain distance before the output member of the transmission begins to move. The result is that the position of a controlled member connected with a control member by the transmission does not necessarily correspond to the position of the control member. In certain fields of application it is of great importance that the controlled member follows exactly changes in the position of the control member. One of the now preferred fields of application of the invention is the design of control devices for the aiming of guns and similar ordnance weapons. With control devices for this purpose it is vitally important that the instruments for instance synchronizing devices which indicate the elevational or azimuth position of a gun relative to a setting device operated by the gun pointer or layer produce highly accurate indications as otherwise the gun cannot be correctly aimed. The instruments used for this purpose are usually precision instruments but while the instruments as such may be highly accurate their indications may be inaccurate nevertheless due to play in the transmission by means which they are actuated. It will now be apparent that it is highly desirable to have available sensitive detecting devices which accurately measure the presence and extent of play in a transmission so that the designer of a control device for aiming the gun can be supplied with data sufficient to compensate and render harmless any play in the transmission.

Accordingly, one of the objects of the present invention is to provide a novel and improved apparatus for conveniently and accurately determining the play present in a transmission such as a gear train.

Another object of the invention is to provide a novel and improved apparatus for measuring with an accuracy sufficient for all practical purposes the play present in a gear train or other mechanical transmisison including an input member and an output member.

Another object of the invention is to provide an apparatus of the general type above referred to which takes in account any resilience that may be present in the transmission and tends to falsify the measurement of the extent of the play.

Still another object of the invention is to provide an apparatus for the purpose aforesaid so designed that its external configuration substantially corresponds to the external configuration of the instrument or device connected to the output member of the transmission the play of which is to be measured. This affords the advantage that the measuring or detecting apparatus can be temporarily substituted for the said instrument for the purpose of checking the transmission without dismantling the entire mechanism of which the instrument forms part. This advantage is of particular importance for gun control devices since the synchronizing means of such devices are generally mounted in positions in the control device to which access is difficult.

Other objects, features and advantages of the invention will be pointed out hereinafter and set forth in the appended claims forming part of the application.

In the accompanying drawing a now preferred embodiment of the invention is shown by way of illustration and not by way of limitation.

Figure 1:
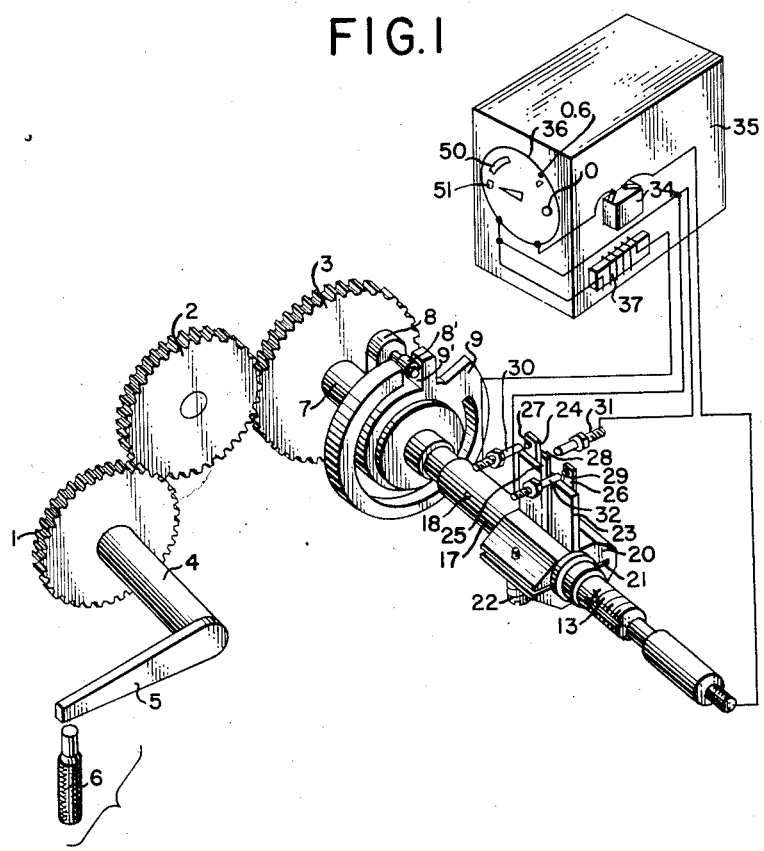
Fig. 1 is an isometric view of the essential parts of a detecting device according to the invention and of the gear train the play of which is to be measured by the detecting device.
Figure 2:
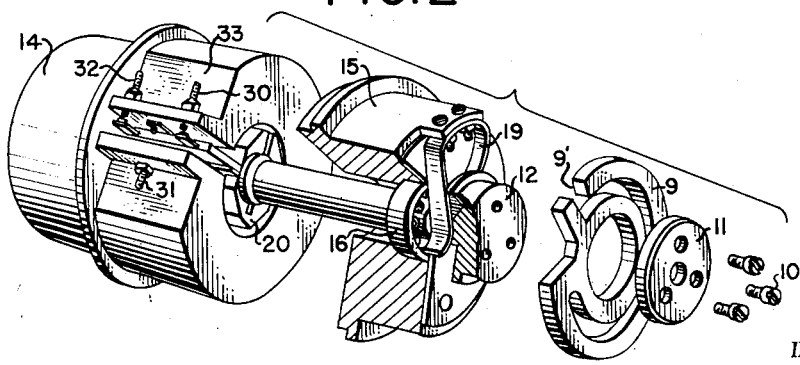
Fig. 2 is an isometric exploded view of part of the detecting device.

Referring first to Figs. 1 and 2 in detail, Fig. 1 shows a transmission in form of a gear train the play of which is to be measured. The gear train may comprise any number of gears. There are shown three gears 1, 2 and 3, gear 1 being the input member and gear 3 the output member of the gear train. Gear 1 is fixedly mounted on a rotary shaft 4 to which is secured an arm 5. This arm coacts with a device 6 for measuring a linear movement, shown as a micrometer. It will be apparent that a movement of arm 5 through a short distance may be considered as a linear movement for the purpose of measurement by micrometer 6. Output gear 3 is fixedly mounted on a shaft 7. This shaft is provided with a radially extending arm 8 from which a feeler pin 8' extends in axial direction. This feeler pin engages a gap 9' formed in a coupling disk 9 which constitutes part of the detecting device. Disk 9 is fixedly secured by screws 10 and a disk 11 to a plate 12 which in turn is fixedly mounted on a shaft 13 of the detecting device. The configuration of coupling disk 9 and its mounting means 10, 11 and 12 can best be seen on Fig. 2. In this connection, it should be pointed out that Fig. 2 shows the corresponding components in a position reversed to that of Fig. 1, that is, for instance coupling disk 9 shown in Fig. 1 on the left hand side of the figure appears on Fig. 2 on the right hand side. Shaft 13 is journaled in two cylindrical housings 14 and 15 by means of ball bearings 16 one of which can be seen on Fig. 2. The two housings are joined by a sleeve-shaped casing which has been omitted to show the components of the detecting device disposed within the casing. In this connection, it should be noted that the external configuration of housings 14 and 15 and the casing joining the same corresponds to the external configuration of the components 42 and 47 of the device according to Fig. 3 for a purpose which will be more fully explained hereinafter. A sleeve 17 is fitted upon the length of shaft 13 between the two ball bearings 16 and is secured to shaft 13 by any suitable means such as a screw or pin 18.

The detecting device according to the invention further comprises contact means which are supported on sleeve 17 by means of a support member 20. Member 20 is fitted upon sleeve 17 and formed with a deep slot 21 extending along the entire length of member 20. The slot can be more or less tightened by adjustment of a screw 22. As will be apparent, depending upon the adjustment of screw 22 the two shanks of member 20 are pressed together more or less. As a result, member 20 forms in effect a friction clutch which permits slipping of shaft 17 relative to member 20 when rotation of the latter is opposed by a force greater than the frictional force between the shanks and sleeve 17. Member 20 mounts a tongue 23 radially projecting from member 20 and supporting three flat contact springs 24, 25 and 26. At the end of each spring a contact stud 27, 28 and 29 respectively is provided. These contacts coact with contact pins 30, 31 and 32 respectively which are mounted on flanges extending from a cylindrical member 33 and are electrically insulated one from another. Member 33 is fixedly mounted within cylindrical housing 14. The housings 14 and 15 and, hence, also member 33 with contact pins 30, 31 and 32 are stationary relative to the contact springs 24, 25 and 26. As will be apparent, rotation of sleeve 17 and, hence, of member 20 in one direction will move contacts 27 and 29 toward contact pins 30 and 32 respectively and rotation of member 20 in the opposite direction will move contact 28 toward contact pin 31. The two contacts 27 and 29 are slightly staggered relative to pins 30 and 32 so that contact 27 will engage pin 30 slightly prior to the engagement between contact 29 and pin 32 in response to a rotation of member 20 in the respective direction. Similarly, contact 28 is staggered relative to the other contacts so that contact 28 will engage pin 31 after contact between contact 27 and pin 30 and also between contact 29 and pin 32 have been broken upon rotation of member 20 in opposite direction. Contact 27 and contact pin 30 are preferably formed with substantially spherical coacting contact surfaces so that an electric arc is formed immediately before closing and immediately after breaking metallic contact between the said two surfaces.

Springs 24, 25 and 26 and, hence, the contacts supported thereon are each connected to one terminal of a source of current shown as a battery 34 of a measuring instrument 35. The second terminal of the battery is connected to one of the terminals of an indicator 36 of the measuring instrument the second terminal of which is connected directly to contact pins 31 and 32 and through an ohmic resistor 37 to contact pin 30. The dial of the indicator 36 is calibrated with a zero position and a marking designated for instance by 0.6. The dial further shows a circumferentially extended marking 50 and a circumferentially narrow marking 51.

In order to insure that all play or slack between the gears of the transmission will be eliminated during the transmission of the movement of the input member to the output member, and in order to take into account a certain resiliency in the gear wheels and shafts of the transmission, the shaft 13 is braked. For this purpose brake means are provided in form of a substantially U-shaped leaf spring 19 which is fastened to housing 15 and the shanks of which are in frictional engagement with shaft 13 or sleeve 17.

The operation of the detecting device, as hereinbefore described, is as follows:

Let it be assumed that it be desired to measure the extent of play within the transmission represented by the gear train 1, 2 and 3. Let it further be first assumed that contacts 27 and 30 are the only ones that are provided and that these contacts are connected with the measuring device 35 and indicator 36 so that these devices will be actuated by a flow of current across contacts 27 and 30.

For the purpose of ascertaining the extent of play in the transmission, arm 5 is first pushed downwardly. As a result, gear 3 is eventually rotated in counter-clockwise direction as seen on Fig. 1. However, due to the play present in the transmission arm 5 may have to be moved through a certain distance before gear 3 begins to rotate. When now gear 3 commences its rotation this rotation will be transmitted to member 20 so that contact 27 begins to move toward contact pin 30. As soon as contact 27 has approached contact pin 30 closely enough an arc will be formed between the two contacts. As a result an energizing circuit is closed through resistor 37 for indicator 36 the pointer of which will now oscillate about the 0.6 mark on the dial or at a point just ahead of this mark such as point 50 due to the comparatively high electric resistance of the arc. When now contact 27 is moved further and into metallic contact with pin 30, the pointer of the instrument 36 will point steadily to the 0.6 mark. This is a very distinct indication of a certain position of the output member and, at this position of the transmission, the position of the arm 5 is measured by the micrometer 6. Arm 5 is then moved upwardly, that is in opposite direction, until gear 3 starts its rotation and begins to move contact 27 away from pin 30. As will be apparent, the extent of the movement of arm 5 in upward direction until it reaches a position in which the aforementioned arc between contacts 27 and 30 reappears constitutes an indication of the play present within the transmission. The extent of this movement is measured by means of micrometer 6. The extent is counted from the position when the arc first is formed.

In practice it is advisable to repeat the measurement several times and to take an average of the data obtained rather than to rely upon a single measurement. As will be apparent, the measuring cycles are repeated by first moving arm 5 upwardly until contact between contact 27 and pin 30 is completely broken and then again moving arm 5 downwardly so as to re-establish metallic contact between contact 27 and pin 30 whereupon the device is ready for a new measurement.

It will be evident from the previous description that the provision of a single pair of contacts 27 and 30 permits to measure the extent of play in the exemplified transmission. However, it has been found that the data thus obtained may not be sufficiently accurate due to the fact that the output member will often start its return movement before all the play in the transmission has been eliminated. In practice it will be necessary to transmit a certain movement after all the play has been removed. The additional pair of contacts 29 and 32 serves to give a signal when the movement of the transmission has been sufficient to insure that during the return movement all the play has been eliminated when the output member passes the position at which the measurement should be carried out.

Closing of the contacts 29 and 32 establishes a direct energizing circuit with the indicator 36 in contrast to the energizing circuit established by the closing of contacts 27 and 30 which includes resistor 37. Consequently, the pointer of the indicator shows a reading of 180°, that is, it will point to the small mark 51 on the dial. This is an indication to the operator that he has moved sufficiently far for reversing the input member.

During the return movement the contacts 29 and 32 will become separated and the pointer of the indicator will pass to the 0.6 marking. After a further movement the output member will come into the position in which an arc will be formed between the contacts 27 and 30. This will immediately become visible upon the indicator and a new measurement is carried out by means of the micrometer 6. The difference between the two measurements is an expression of the play and resiliency in the transmission at the certain braking offered by the brake 19.

As it is generally desirable to obtain a plurality of measurements the return movement may be continued until the contacts 28 and 31 are closed. This will be visible on the indicator, the pointer of which will pass from the zero position to the position indicated by 51. The contacts 28 and 31 will come into contact at an angular position of the output member such that the output member, when returned into the position at which the measurements take place, has been moved through a distance sufficient to eliminate all the play in the transmission.

Referring again to the initial downward movement of arm 5 preparatory to the upward movement of the arm for the purpose of obtaining the data as to the extent of the play, the downward movement of the arm is continued until metallic contact is established between contacts 29 and 32 which as previously mentioned are circumferentially staggered relative to contacts 27 and 30 so that they are closed posteriorly to these contacts. The said staggering of contacts 29 and 32 is so selected that any possible resilience in the transmission is absorbed when gear 3 and with it contact spring 26 has reached a position in which contacts 29 and 32 are closed. Closing of these contacts establishes a direct energizing circuit for the indicator 36 in contrast to the energizing circuit established by the closing of contacts 27 and 30 which includes resistor 37. Consequently, the pointer of the indicator shows a reading of 180°, that is, it will point to the small mark 51 on the dial. The actual measuring operation is now carried out by moving arm 5 upwardly and measuring by means of micrometer 6 the distance through which arm 5 has to be moved until the arc is formed between contacts 27 and 30. The upward movement of arm 5 is preferably continued until contacts 28 and 31 engage each other which closes an energizing circuit for indicator 36.

As will now be apparent, the frictional coupling between member 20 and sleeve 17 protects the contacts against damage due to an attempt to rotate gear 3 beyond a position in which a proper metallic contact is established between the respective pairs of contacts. If such an attempt be accidentally made member 20 will begin to slip upon sleeve 17.

Figure 3:
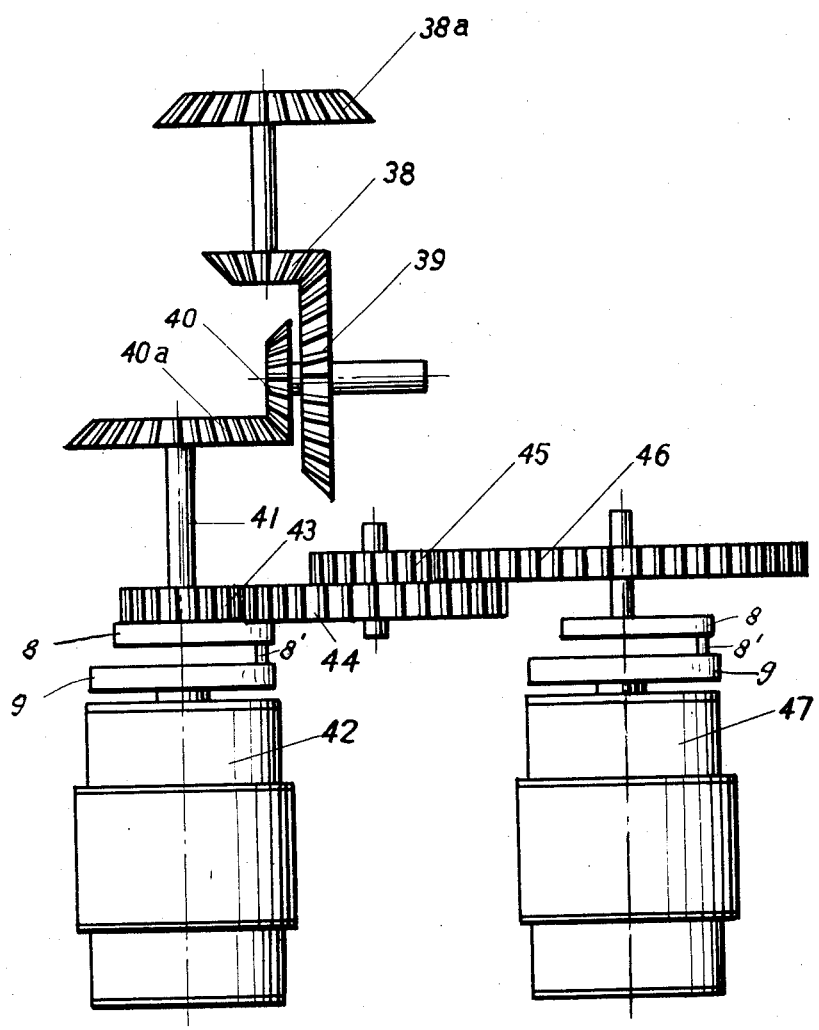
Fig. 3 is a diagrammatic view of part of a control device which may be temporarily replaced by the detecting device according to the invention for the purpose of measuring the extent of play in the transmissions of the control device.

It has been previously explained that the external configuration of the detecting assembly with the exception of the measuring and indicating means 35 and 36 is such that it corresponds to certain components in the control mechanism for aiming a gun of which the illustrated gear train constitutes a part. Fig. 3 shows the parts of the control device which are essential for an understanding of this feature of the invention. These parts of the control device comprise a transmission in form of a gear train including the gears 38a, 38, 39, 40, 40a which drive through a shaft 41 a synchronizing device 42 and through an additional gear train including the gears 43, 44, 45 and 46 a second synchronizing device 47. These synchronizing devices may be visualized as angle measuring means in the aiming mechanism. Inasmuch as the aiming mechanism as such does not constitute part of the present invention a description of the synchronizing devices 42 and 47 is not deemed to be essential for the understanding of the invention. It suffices to state that it is of great importance for the proper and accurate functioning of the aiming mechanism to determine whether and to what extent the angles transmitted and indicated by the synchronizing devices differ from the angles actually applied to the transmission at the input gear 38a.

As previously mentioned, the outer shape of the detecting device as represented by housings 14 and 15 and the sleeve connecting the same is identical with the outer shape of synchronizing devices 42 and 47 respectively. Furthermore, the coupling members by which the synchronizing devices are coupled with the respective output members of the transmissions are similar to those of the detecting device as is symbolized by the numerals 8, 8' and 9 on Fig. 3. Consequently, the synchronizing devices 42 and 47 may be temporarily replaced, one by one, by the detecting device for the purpose of measuring the play in the respective transmission, thereby providing for a convenient determination of the play in the transmissions of a gun aiming mechanism.

While the invention has been described in detail with respect to a certain now preferred example and embodiment of the invention it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent, is:

1. An apparatus for measuring play in a mechanical transmission including an input member and an output member, the said apparatus comprising detecting means including two pairs of contacts each having a stationary contact and a contact movable in unison with the output member, said two movable contacts being staggered so that one movable contact engages the respective stationary contact prior to the other movable contact engaging the respective stationary contact upon movement of the output member in one direction, electric signal means connected in energizing circuits with said contact means for producing a first signal upon engagement of the two contacts first to engage each other and a second signal upon engagement of the contacts second to engage each other, the said second contacts being closed after a movement of the input and output member which is greater than the greatest expected play in the transmission movement of the input member in the opposite direction effecting successive disengagement of said pairs of contacts and hence extinction of the signals and means to measure the extent of the movement of the input member required to move the output member through a distance in said opposite direction to effect extinction of the first signal, the extent of said movement being a measure of the play in the transmission, the distance being measured from the position of the input member in which the first signal was produced by the closing of the contacts during the first movement.

2. An apparatus according to claim 1, wherein the said detecting means comprise a rotatable shaft arranged to be operatively coupled with said output member for rotation in unison therewith, and wherein the said movable contacts are mounted on said shaft for rotation together therewith.

3. An apparatus according to claim 2, wherein friction coupling means are interposed between said movable contacts and said rotatable shaft, and adjustment means coact with said coupling means for varying the frictional coupling force exerted by said coupling means.

4. An apparatus according to claim 2, wherein braking means coact with said rotatable shaft for yieldably restraining the rotation of the same.

5. An apparatus according to claim 4, wherein the said braking means comprise a spring means frictionally engaging said rotatable shaft.

6. An apparatus according to claim 1, wherein the said detecting means include a third pair of contact means having a stationary contact and a movable contact engageable with its stationary contact upon movement of the output member in the said opposite direction, engagement of the contacts of said third contact means and of the contacts of the said contact means controlling the second signal defining the limits of movement of the output member in either direction, the said third pair of contact means being connected in an energizing circuit with said signal means for producing a third signal upon engagement of the contacts of said third pair.

7. An apparatus according to claim 6, wherein the said electric signal means include two terminals and a source of current, the said three movable contacts being connected in circuit with a terminal of the source of current and the three stationary contacts being connected in parallel with a terminal of the signal means, the other terminal of the source of current being connected with the second terminal of the signal means, and wherein an ohmic resistance means is included in the connection of the stationary contact of said first engaging pair of contacts with the respective terminal of the signal means.

References Cited in the file of this patent

UNITED STATES PATENTS

| | | |
|---|---|---|
| 1,233,014 | Baker | July 10, 1917 |
| 1,894,025 | Dennison | Jan. 10, 1933 |
| 2,116,842 | Metcalf | May 10, 1938 |
| 2,278,379 | Koster | Mar. 31, 1942 |
| 2,719,428 | Lambie | Oct. 4, 1955 |